(12) United States Patent
Judd et al.

(10) Patent No.: US 12,371,218 B2
(45) Date of Patent: Jul. 29, 2025

(54) DOCKING STATION STORING REMOTE CONTROL FOR INFLIGHT ENTERTAINMENT SYSTEMS

(71) Applicant: Thales Avionics, Inc., Irvine, CA (US)

(72) Inventors: Kevin Judd, Irvine, CA (US); Bipin Bopaliya, Irvine, CA (US); Sam Yoon, Irvine, CA (US); Ton Do, Corona, CA (US); John J. Daly, Irvine, CA (US); Brian Johnson, Dana Point, CA (US)

(73) Assignee: Thales Avionics, Inc., Irvine, CA (US)

( * ) Notice: Subject to any disclaimer, the term of this patent is extended or adjusted under 35 U.S.C. 154(b) by 33 days.

(21) Appl. No.: 18/399,246

(22) Filed: Dec. 28, 2023

(65) Prior Publication Data

US 2025/0214739 A1     Jul. 3, 2025

(51) Int. Cl.
*H04M 1/06* (2006.01)
*B64D 11/00* (2006.01)
*B65D 1/34* (2006.01)
*B65D 25/02* (2006.01)
*F16M 11/04* (2006.01)

(52) U.S. Cl.
CPC .......... *B65D 1/34* (2013.01); *B64D 11/00155* (2014.12); *B65D 25/02* (2013.01)

(58) Field of Classification Search
CPC .......... H04M 1/06; H04M 1/15; F16M 11/04; F16M 11/041; G06F 1/1662; G06F 1/1666; G06F 3/0346; B64D 11/06; B64D 11/00155; B65D 1/34; B65D 25/02; A63F 13/24; A63F 13/98

USPC ...... 206/320, 560; 244/129.1; 345/169, 173; 455/575.1, 575.8; 463/37; 379/449, 455; 701/2

See application file for complete search history.

(56) References Cited

U.S. PATENT DOCUMENTS

| 5,410,597 | A  | * | 4/1995  | Kepley, III | H04M 1/11 379/446 |
| 5,652,792 | A  | * | 7/1997  | Gallagher | H04M 1/06 379/454 |
| 6,324,285 | B1 | * | 11/2001 | Dowsett | H04M 1/15 379/446 |
| 6,735,309 | B1 | * | 5/2004  | Lemanski | H04M 1/04 379/438 |
| 9,853,673 | B2 | * | 12/2017 | Usuginu | H04B 1/3877 |
| 9,916,013 | B2 | * | 3/2018  | Sizelove | G06F 3/023 |
| 10,616,389 | B2 | * | 4/2020 | Sato | F16M 13/00 |
| 2009/0079705 | A1 | * | 3/2009 | Sizelove | A63F 13/40 244/129.1 |

(Continued)

*Primary Examiner* — Luan K Bui
(74) *Attorney, Agent, or Firm* — Sage Patent Group (57) ABSTRACT

A docking station for storing a handset. A storage tray has a first recessed area for storing the handset and a second recessed area for a passenger to grip a top surface of the stored handset. The docking station includes a second latch extended into the second recessed area to engage an indent in the bottom surface of the handset. The docking station includes a first latch extended into the second recessed area to engage an indent located in the front surface of the handset. Depression of a release actuator retracts the first latch to release the top surface of the handset. The release actuator extends through an opening in the first recessed area, which has a length sufficient to allow a finger to actuate the release actuator and grip the top surface of the remote control handset while the remote control handset is stored in the storage tray.

15 Claims, 4 Drawing Sheets

(56) References Cited

U.S. PATENT DOCUMENTS

2016/0378199 A1* 12/2016 Sizelove ............... G06F 3/0202
235/449

* cited by examiner

DOCKING STATION STORING REMOTE CONTROL FOR INFLIGHT ENTERTAINMENT SYSTEMS

TECHNICAL FIELD

The present disclosure relates to inflight entertainment systems and, more particularly, to handset devices operated by users to control connected inflight entertainment systems.

BACKGROUND

Modern aircraft are equipped with sophisticated in-flight entertainment systems to cater to the diverse preferences of passengers during air travel. The handheld controller, or handset, is an important component in the system, enabling passengers to navigate through multimedia options seamlessly. Handsets are stored in docking stations when not used, to avoid interfering with passenger movement and reduce risk of damage. However, continuous usage and high operational demands contribute to gradual degradation of docking stations, leading to issues with the ability of docking stations to securely retain handsets while stored and to enable passengers to easily release the handsets for use.

One recurrent problem encountered with conventional docking stations is the susceptibility of the release actuator mechanism to wear and damage. In cases where the release actuator fails, passengers can face challenges with retrieving the handset and which can significantly impact passenger satisfaction with the inflight entertainment system.

SUMMARY

Some embodiments of the present disclosure are directed to a docking station apparatus for storing and releasing a remote control handset. The docking station apparatus includes a storage tray adapted to receive and releasably store the remote control handset. The storage tray has a first recessed area between the second recessed area and a first end surface of the docking station apparatus. The docking station apparatus also includes a second latch extended into the second recessed area from a second end surface of the docking station apparatus, wherein the second latch is configured to engage an indent located in a bottom surface of the remote control handset. The docking station apparatus also includes a first latch extended into the second recessed area from the first end surface of the docking station apparatus. The first latch is aligned with and extends toward the second latch. The first latch is configured to engage an indent located in a top surface of the remote control handset. The docking station apparatus also includes a release actuator resiliently connected to the first latch. Depression of the release actuator retracts the first latch toward the first end surface of the docking station apparatus to release the top surface of the remote control handset. Subsequent release of the release actuator extends the first latch toward the first end surface of the docking station apparatus to enable engagement with the top surface of the remote control handset. The release actuator extends through an opening in the first recessed area, the first recessed area having a length along a major axis of the storage tray sufficient to allow a finger to actuate the release actuator and grip the top surface of the remote control handset while the remote control handset is stored in the storage tray.

Other docking station apparatuses according to embodiments of the present disclosure will be or become apparent to one with skill in the art upon review of the following drawings and detailed description. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of aspects of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of a docking station apparatus which releasably stores a remote control handset for controlling inflight entertainment (IFE) systems in an aircraft, other embodiments are not limited thereto and may be used with other types of vehicles, including, without limitation, ships (e.g., cruise ships), buses, and trains. A non-limiting example entertainment system includes a seat display unit which can be mounted to a seatback, armrest, or other location to display content (e.g., movies, television programming, gaming, etc.) and stream audio (e.g., via a headset jack and/or wireless interface protocol such as, but not limited to, Bluetooth, Bluetooth Low Energy, or WiFi).

As air travel has become an integral part of modern life, IFE systems have evolved to meet passengers' (or other users') expectations for a comfortable and enjoyable journey. IFE remote control handsets are indispensable components of these systems, providing users with a convenient and possibly personalized interface for accessing IFE content. The need for a secure, easily accessible, and fail-safe storage solution for storing these handsets during non-use is paramount, prompting the development of the enhanced docking station described herein.

The terms IFE remote control handset, handset, remote control, remote, portable control device, controller, and clicker may be used interchangeably. A handset is a broad term typically used to describe a handheld device or unit that is designed for communication, control, or other electronic interaction with an entertainment system. Handsets may also refer to remote controls for various consumer electronics, including television sets, audio systems, gaming consoles, and other home or vehicle automation devices. Handsets may also be used for controlling and monitoring machinery, equipment, or processes.

The terms docking station apparatus, docking station, and handset cradle may be used interchangeably. A docking station for a handset is a device or accessory designed to provide a convenient and often secure location for the placement, charging, and/or electrical connection of a handset with the entertainment system. The primary purpose of a docking station is to enhance the functionality, usability, and accessibility of the handset.

Although some docking stations are described in the context of providing wired (cables) communication connectivity between handsets and associated entertainment systems, other docking stations may be used with handsets that wirelessly communicate with associated entertainment systems.

The docking station should not only securely store remote control handsets but also address common issues associated with failures in active and heavily-used docking stations. According to the Bureau of Transportation Statistics, for the full year 2022, January through December, U.S. airlines carried 853 million passengers. Airlines and groups tasked with maintaining the many devices and furniture passengers interact with on every flight are often not able to immediately fix or even identify broken or malfunctioning devices inside aircraft during the short periods an aircraft is on the ground. This may lead to many passengers experiencing broken or malfunctioning devices before the airline is able to source repair resources and fix the device.

In the context of a docking station, malfunctioning docking stations may fail to unlock handsets from the docking station and, thereby, prevent comfortable use of the handset by the user. Traditionally, docking stations include a release actuator which is resiliently connected to a latch holding the handset to the docking station. The resilient connection can be provided by a metal spring or elastomer. However, these springs and elastomers can degrade and fail over time from repetitive and sometimes harsh use. Even if the handset is not mechanically locked to the docking station, the handset may require uncomfortable and inconvenient amounts of effort to retrieve the handset without a feature built into the docking station to allow users to grip the handset while it is fully stored in the docking station or slightly released. Therefore, various embodiments of the present disclosure introduce docking station apparatuses that are adapted to ensure the reliable release and retrieval of handsets, even in the event of a malfunction, and thereby enhancing the overall reliability and passenger experience.

Various embodiments of the present disclosure are directed to a docking station apparatus (hereinafter docking station) designed for storing and retrieving IFE remote control handsets aboard aircraft. The docking station includes a unique combination of features, including a storage tray with recessed areas, latches, and a release actuator, that operate to enhance the convenience and security of IFE remote control handset storage during flight.

Figure 1:
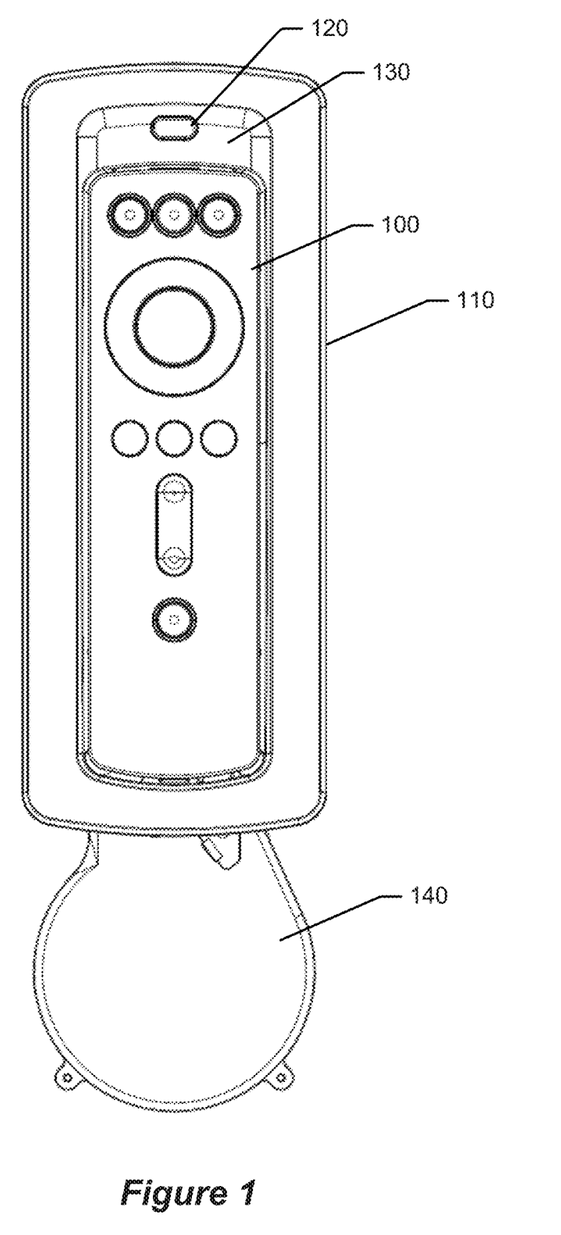
FIG. 1 illustrates an example of a handset device securely stored in a docking station apparatus in accordance with some embodiments.

FIG. 1 illustrates an example of a handset 100 secured for storage in a docking station 110 in accordance with some embodiments. The handset 100 has a plurality of user selectable interface elements, e.g., buttons in various shapes. The docking station apparatus 110 includes a storage tray adapted to receive and releasably store the handset 100. The docking station 110 also includes a release actuator 120 configured be resilient and release the handset 100 upon user activation. The storage tray has a first recessed area 130, or recessed extraction area, which is configured to allow a user to retrieve the handset 100 even upon malfunction of the release actuator 120. The docking station 110 may also include a cable retraction mechanism 140 configured to store and automatically recoil or retract a cable communicatively connecting the handset 100 to an electronic component of an entertainment system device the handset 100 is configured to control or monitor. The cable retraction mechanism 140 can operate to prevent tangling of the cable and provide organized cable storage which avoids cable interference with storage of the handset in the docking station 110.

The docking station 110 can be installed proximate to a passenger's seat, e.g., mounted to structure of the passenger seat or adjacent thereto, to facilitate passenger access to the handset 100. As explained further below, the handset 100 is operable by a passenger to control selection and delivery of content from an IFE content server to a display unit, control selection and delivery of ground-based content through a connectivity server connected through a satellite network with ground web servers (e.g., browser Internet web servers), play games, signal a flight attendant, control settings of the display unit (e.g., brightness, volume, display on/off, etc.), control seat lighting, control seat actuator(s) (e.g., recline actuator), etc. The handset 100 enables an important convenience for passengers having premium class seating where conventional touch-screen controls provided through seat video display units can be too distant for convenient access (e.g., while seating is reclined) and may provide a necessary accessibility interface for passengers having mobility issues.

Figure 2:
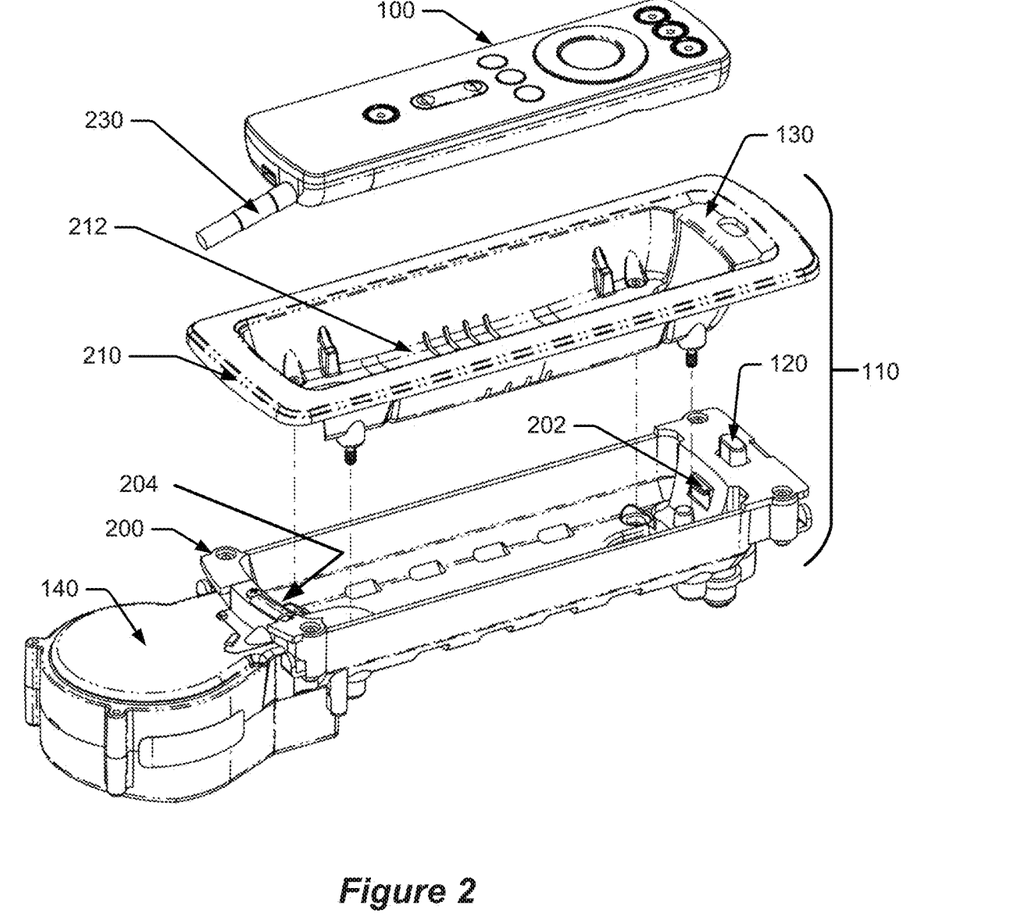
FIG. 2 illustrates an exploded view of the example handset device and docking station apparatus in accordance with some embodiments.

FIG. 2 illustrates an exploded view of the example handset device 100 and docking station 110 which is attached to a mounting device 200 in accordance with some embodiments. The handset device 100 can be removed from the docking station 110 and remain communicatively connected to an entertainment system via a cable that is extendable from the cable retraction mechanism 140 which is part of the mounting device 200. The mounting device 200 may be mounted to a seat surface (e.g., seatback, armrest, seating cubicle surface, bulkhead, etc.). The docking station is equipped with a specially designed storage tray 210 adapted to receive and releasably store a handset 100. A storage tray 210 may be secured to the mounting device 200.

The cable retraction mechanism 140 can be connected to the first end surface of the docking station apparatus. The cable retract mechanism is adapted to retract a cable extending through an opening in the storage tray in the second recessed area and to connect to the remote control handset, wherein the cable comprises conductors adapted to supply power and conduct electrical signals indicating passenger selection of buttons on the remote control handset.

Referring to FIG. 2, in various embodiments of the present disclosure are directed to a docking station apparatus 110 for storing and retrieving a IFE remote control handset 100. The docking station apparatus 110 includes a storage tray 210 adapted to receive and releasably store the IFE remote control handset 100. The storage tray 210 has a first recessed area 130 between the second recessed area 212 and a first end surface of the docking station apparatus 110. The docking station apparatus 110 also includes a second latch 204 extended into the second recessed area from a second end surface of the docking station apparatus 110, wherein the second latch 204 is configured to engage an indent located in a bottom surface of the IFE remote control handset 100. The docking station apparatus 100 also includes a first latch 202 extended into the second recessed area from the first end surface of the docking station apparatus 110. The first latch 202 is aligned with and extends toward the second latch 204. The first latch 202 is configured to engage an indent located in a top surface of the IFE remote control handset 100. The docking station apparatus 110 also includes a release actuator 120 resiliently connected to the first latch 202. Depression of the release actuator 120 retracts the first latch 202 toward the first end surface of the docking station apparatus 110 to release the top surface of the IFE remote control handset 100. Subsequent release of the release actuator 120 extends the first latch 202 toward the first end surface of the docking station apparatus 110 to enable engagement with the top surface of the IFE remote control handset 100. The release actuator 120 extends through an opening in the first recessed area 130, the first recessed area 130 having a length along a major axis of the storage tray 210 sufficient to allow a finger to actuate the release actuator 120 and grip the top surface of the IFE remote control handset 100 while the remote control handset is stored in the storage tray.

The handset 100 of FIG. 2 optionally includes a power and communication cable 230.

In some embodiments, the front surface of the IFE remote control handset is aligned, or flush, with a front surface of the docking station apparatus. The alignment of the front surface of the IFE remote control handset and docking station apparatus means that the handset may not be easily pried from the docking station apparatus without a passenger using a finger extending into the first recessed area of the docking station apparatus to grip the top surface of the remote control handset while the remote control handset is stored in the storage tray.

The second recessed area within the storage tray is sized to receive and store the handset. The first recessed area is positioned between the second recessed area and the first end surface of the docking station. The first latch, aligned with and extending toward a second latch at the opposite end surface, engages an indent located in the top surface of the handset. Simultaneously, the second latch engages an indent in the bottom surface of the handset, creating a secure storage configuration.

The combination of the first and second latches ensures a secure hold on the handset during flight, preventing unintended releases. The engagement of latches with indents on both the top and bottom surfaces of the handset enhances stability and prevents accidental dislodgment during turbulence or abrupt movements.

Facilitating the release of the handset is a release actuator resiliently connected to the first latch. The depression of the release actuator initiates the retraction of the first latch towards the first end surface of the docking station, consequently releasing the top surface of the handset. The subsequent release of the actuator allows the first latch to extend, enabling re-engagement with the top surface of the handset.

In other words, in some embodiments, the first latch is resiliently biased to extend into the second recessed area.

The release actuator is positioned to extend through an opening in the first recessed area. In some embodiments, the release actuator extends through the opening in the first recessed area of the docking station with a length that does not extend beyond the front surface of the storage tray to avoid accidental depression.

One of the distinguishing features of some embodiments is that the handset can be conveniently retrieved from the docking station by a passenger gripping the top surface of the handset in the first recessed area to pry the handset away from the second recessed area of the docking station. This design facilitates passenger removal of the handset even if not completely released by operation of the release actuator, through conveniently gripping of the top surface of the handset. Importantly, the length of the first recessed area along the major axis of the storage tray enables a user's finger to actuate the release actuator and grip the top surface of the handset. The docking station apparatus thereby not only enhances ease of use but also serves as a crucial fail-safe mechanism for a passenger to pry loose the remote control handset from the first latch when the first latch is not completely disengaged from the indent of the remote control handset despite actuation of the release actuator.

Given the complexities associated with managing a multitude of active and heavily-used docking stations, various embodiments can provide a fail-safe design. These embodiments ensure that even if resilient (e.g., spring) components of the docking station become worn and fail to cause sufficient disengagement of the latch from the handset by the release actuator, the handset may still be reliably released and retrieved by passenger finger engagement. Such fail-safe measures not only enhance the overall reliability of the docking station but also mitigate the challenges faced by operators in identifying and addressing every potential failure during operation.

In some embodiments, the length of the first recessed area along the major axis of the storage tray is at least 10 mm in length from the edge of the second recessed area to a leading edge of the first recessed area. Assuming the average adult index finger is 20 mm high, the average adult will require the first recessed area to be at least 10 mm in length to compress the release actuator and/or scoop out the handset. Thus, in a further embodiment, the length of the first recessed area along the major axis of the storage tray is at least 20 mm from the edge of the second recessed area to the closest edge of the first recessed area. In still a further embodiment, the length of the first recessed area along the major axis of the storage tray is not greater than 30 mm from the edge of the second recessed area to the closest edge of the first recessed area.

Figure 3:
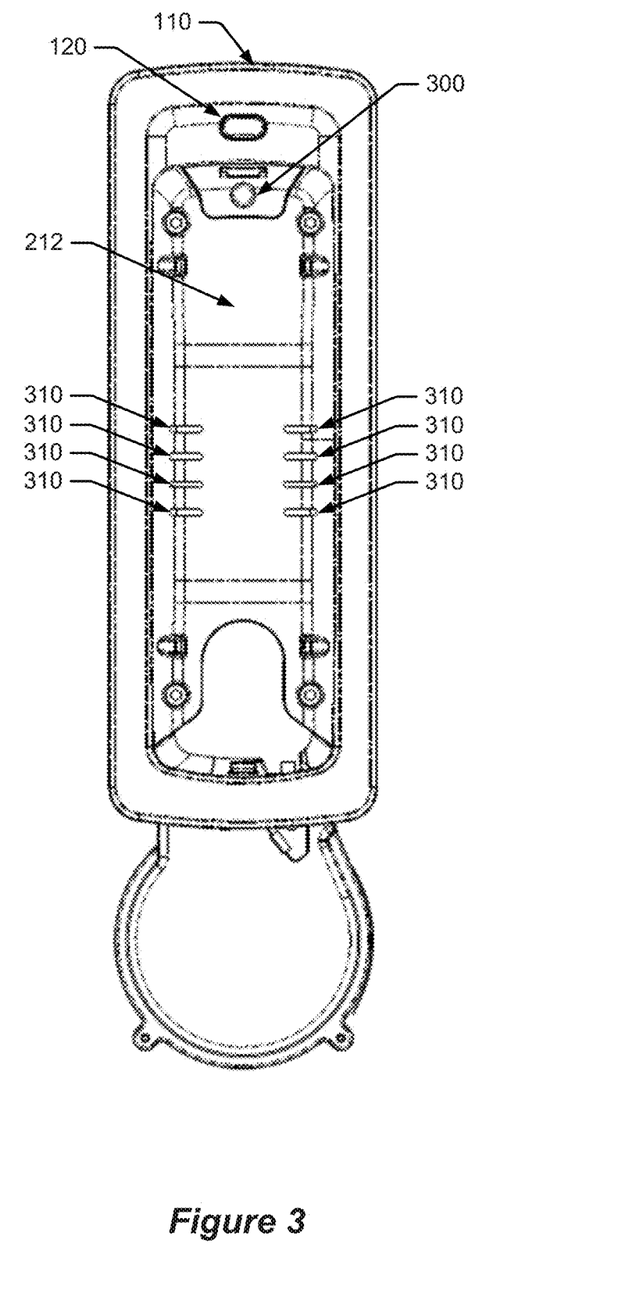
FIG. 3 illustrates a top view of the example docking station apparatus with an eject pin in accordance with some embodiments.

FIG. 3 illustrates a top view of the example docking station 110 with an eject pin 300 in accordance with some embodiments. The eject pin 300 is configured to assist the lifting of the handset 100 from the second recessed area 212 upon depression of the release actuator 120.

In other words, in some embodiments, the docking station also includes an eject pin extending into the first recessed area from the storage tray, the eject pin resiliently biased while depressed by the remote control handset when stored, the eject pin adapted to push the remote control handset upward away from the storage tray when released by the release actuator.

In some embodiments, the docking station 110 also includes drain cut outs 310 adapted to drain liquid spilled into the second recessed area 212 to protect the handset while stored.

In some embodiments, such as illustrated in the example docking station of FIG. 2, the storage tray is a detachable liner where the first recessed area and second recessed area and the storage tray have at least one opening through which the first latch and second latch extend. The liner can have a first opening through which the first latch extends and have a second opening through which the second latch extends.

In some embodiments, the storage tray is not a detachable liner and instead integrated with the mounting device 200 of FIG. 2.

As discussed above, in some embodiments, the docking station apparatus is configured to be releasably attached to a structural member of a seat. The docking station apparatus may be attached to a set adjacent to seat video unit which is controlled by the associated remote control handset. Alternatively, the docking station apparatus may be attached to an armrest of a set, adjacent to an armrest, or elsewhere reachable by a passenger while seated.

As the aviation industry continues to evolve, the docking station opens avenues for further advancements. In some embodiments, the docking station may incorporate smart technologies, such as sensors and connectivity features, that can be configured to provide real-time feedback to the entertainment system and/or operators, allowing for proactive maintenance and further improving overall reliability. Additionally, the docking station could be designed to accommodate various sizes and shapes of handsets, catering to the diverse range of handsets available on the market.

The docking station may be constructed from lightweight, durable materials suitable for aviation environments. The design of the docking station may be optimized to meet safety standards, ensuring the reliability and longevity of the docking station apparatus. In one embodiment, the storage tray 210 (also called "bezel") is formed from metal, such as aircraft grade aluminum, or another material having properties of visually appearing to passengers as a high quality material while resisting showing signs of wear or failure over the life of the docking station.

In other words, in some embodiments, the docking station apparatus is constructed from lightweight, durable materials suitable for aviation environments.

Controller circuitry (e.g., in the handset device 100) is configured to respond to user selections among the user selectable interface elements of the handset by triggering corresponding control signaling to be communicated through the interface and the cable or via a wireless communication interface to control an electronic component of the entertainment system. Some or all of the controller circuitry may reside in the entertainment system, e.g., as part of the circuitry which operates a seat video display unit. Accordingly, the term controller circuitry can refer to only circuitry which resides in the handset configured to be held by a user to remotely control the entertainment system, or may additionally refer to circuitry residing in the entertainment system which communicates with circuitry in the handset device 100. Also, the term "handset" is not limited to being configured for being held in a user's hand, but moreover includes other types of user interface device having user selectable interface elements which are selectable by a user's hand but where the device is not configured to be handheld.

Figure 4:
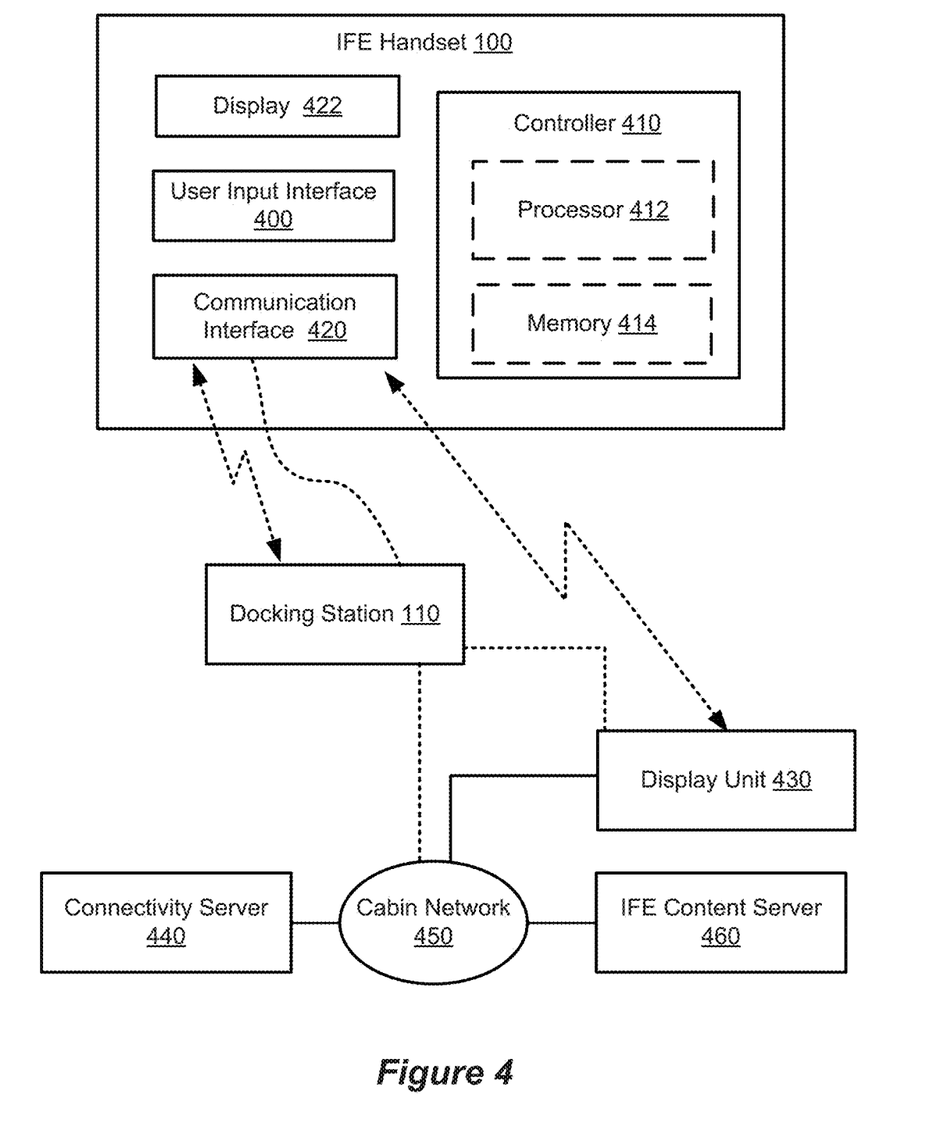
FIG. 4 illustrates a simplified system block diagram of an example handset device communicatively connected to control a display unit of an entertainment system, in accordance with some embodiments.

FIG. 4 illustrates a simplified system block diagram of an example handset device communicatively connected with a display unit, in accordance with some embodiments.

Referring to FIG. 4, the handset 100 is operable by a passenger to control selection and delivery of content from an IFE content server 460 to the display unit 430, control selection and delivery of ground-based content through a connectivity server 400 connected through a satellite network with ground web servers (e.g., browser Internet web servers), play games, signal a flight attendant, control settings of the display unit 430 (e.g., brightness, volume, display on/off, etc.), control seat lighting, control seat actuator(s) (e.g., recline actuator), etc. The handset 100 includes a user input interface 400 (e.g., buttons, touch pad, sliders, etc.) and a controller 410. The controller 410 may include at least one processor 412 that executes instructions stored in at least one memory 414 to control other components of the handset 100 and the system to perform operations in accordance with one or more of the embodiments disclosed herein. The controller 410 may alternatively or additionally include an application specific integrated circuit configured to operate in accordance with one or more of the embodiments disclosed herein. The handset 100 may include a display 422 to display text, graphical indica, pictures, and/or video provided by the display unit 430, the IFE content server 460, the connectivity server 440, and/or another component of the system. The display 422 may include a touch-sensitive screen interface which functions as part-of or entirety of the user input interface 400.

The handset 100 includes a communication interface 420 which communicates through communication cord (230 FIG. 2) passing through the docking station 110 or communicates through a wireless communication interface with components of the system (e.g., display unit 430, the IFE content server 460, connectivity server 440, etc.). For example, the handset 100 may communicate via a wired connection through the docking station 110 with the display unit 430 (e.g., seatback mounted display, armrest mounted display, etc.) or may communicate via the cabin network 451 (e.g., Ethernet) with the display unit 430 and other components of the system. The handset 100 may alternatively communicate via a wireless communication interface (e.g., Bluetooth, WiFi, etc.) with the display unit 430 and other components of the system.

Further Definitions and Embodiments

In the above description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, etc.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A docking station apparatus operative to store and release a vehicle entertainment system remote control handset, the docking station apparatus comprising:
   a storage tray adapted to receive and releasably store the remote control handset in a second recessed area, wherein the storage tray has a first recessed area between the second recessed area and a first end surface of the docking station apparatus;
   a second latch extended into the second recessed area from a second end surface of the docking station apparatus, wherein the second latch is configured to engage an indent located in a bottom surface of the remote control handset;
   a first latch extended into the second recessed area from the first end surface of the docking station apparatus, wherein the first latch is aligned with and extends toward the second latch, and the first latch is configured to engage an indent located in a top surface of the remote control handset;
   a release actuator resiliently connected to the first latch, wherein depression of the release actuator retracts the first latch toward the first end surface of the docking station apparatus to release the top surface of the remote control handset, and wherein subsequent release of the release actuator extends the first latch toward the first end surface of the docking station apparatus to enable engagement with the top surface of the remote control handset; and
   the release actuator extends through an opening in the first recessed area, the first recessed area having a length along a major axis of the storage tray sufficient to allow a finger to actuate the release actuator and grip the top surface of the remote control handset while the remote control handset is stored in the storage tray.

2. The docking station apparatus of claim 1, wherein the front surface of the remote control handset is aligned with a front surface of the docking station apparatus.

3. The docking station apparatus of claim 1, wherein the first latch is biased by a spring member to extend into the second recessed area.

4. The docking station apparatus of claim 1, wherein:
the release actuator extends through the opening in the first recessed area with a length that does not extend beyond a front surface of the storage tray to avoid accidental depression.

5. The docking station apparatus of claim 1, wherein:
the second recessed area is recessed deeper than the first recessed area.

6. The docking station apparatus of claim 5, wherein:
depth of the second recessed area is at least as great as thickness between front and back surfaces of the remote control handset.

7. The docking station apparatus of claim 5, wherein:
the second recessed area is recessed at least twice as deep as the first recessed area.

8. The docking station apparatus of claim 1, wherein the length of the first recessed area along the major axis of the storage tray is at least 10 mm from an edge of the second recessed area to a closest edge of the first recessed area.

9. The docking station apparatus of claim 8, wherein the length of the first recessed area along the major axis of the storage tray is at least 20 mm from the edge of the second recessed area to the closest edge of the first recessed area.

10. The docking station apparatus of claim 9, wherein the length of the first recessed area along the major axis of the storage tray is not greater than 30 mm from the edge of the second recessed area to the closest edge of the first recessed area.

11. The docking station apparatus of claim 1, further comprising:
an eject pin extending into the first recessed area from the storage tray, the eject pin resiliently biased while depressed by the remote control handset when stored, the eject pin adapted to push the remote control handset upward away from the storage tray when released by the release actuator.

12. The docking station apparatus of claim 1, wherein the storage tray is a liner detachable from a mounting device, the liner having a first opening through which the first latch extends and having a second opening through which the second latch extends.

13. The docking station apparatus of claim 1, wherein the docking station apparatus is configured to be releasably attached to a structural member of a seat.

14. The docking station apparatus of claim 1, further comprising:
drain cut outs adapted to drain liquid spilled into the second recessed area to protect the handset while stored.

15. The docking station apparatus of claim 1, wherein the docking station apparatus comprises a cable retract mechanism connected to the first end surface of the docking station apparatus, the cable retract mechanism adapted to retract a cable extending through an opening in the storage tray in the second recessed area and to connect to the remote control handset, wherein the cable comprises conductors adapted to supply power and conduct electrical signals indicating passenger selection of buttons on the remote control handset.

* * * * *